Nov. 18, 1958   K. W. BERG ET AL   2,860,486
SECURITY DEVICE FOR HYDRAULIC OPERATED VEHICLE BRAKES
Filed Sept. 24, 1954

INVENTORS
KÅRE W. BERG,
FRIDTJOF BALCHEN &
SIGVARD AARDAHL
By Young, Emery & Thompson
ATTYS United States Patent Office 2,860,486
Patented Nov. 18, 1958

2,860,486

SECURITY DEVICE FOR HYDRAULIC OPERATED VEHICLE BRAKES

Kåre W. Berg, Reistad, Fridtjof Balchen, Hundorp, and Sigvard Aardahl, Vinstra, Norway Application September 24, 1954, Serial No. 458,068

Claims priority, application Sweden September 25, 1953

4 Claims. (Cl. 60—54.5)

The present invention relates to a security device for hydraulic operated vehicle brakes of the type in which, if a leak arises in any of the pressure pipes to the brakes or in the brakes proper, the supply of pressure liquid to the pressure pipe in question is automatically shut off.

One object of the invention is to provide a device of the type referred to which is simple and cheap in production but still effective in operation.

Another object of the invention is to provide a security device in which the connection between the pressure source and each of the pressure pipes leading to the brakes is permanently closed by yielding means permitting the liquid displacement necessary for the operation of the brakes.

The invention is mainly distinguished thereby that between the pressure source and each of the pressure pipes leading to the brakes is interposed an elastic membrane permanently closing the passage therebetween.

Figure 1:
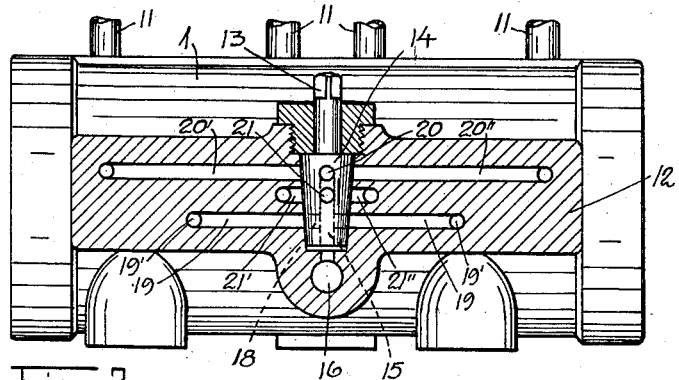
Figure 2:
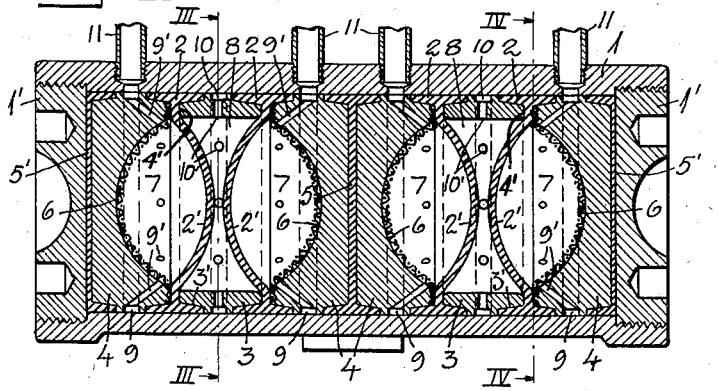
Figure 3:
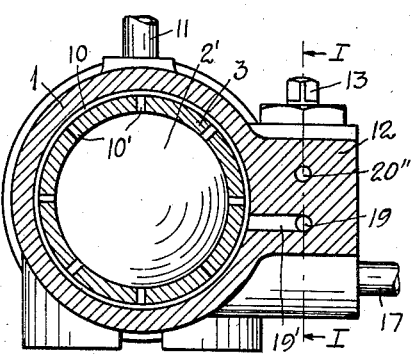
Figure 4:
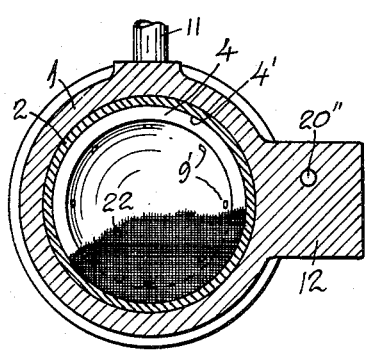

An embodiment of the invention is, as an example, illustrated in the accompanying drawing in which:

Figure 1 is a side elevation, with a vertical section along the line I—I in Figure 3, of a device according to the invention, Figure 2 is an axial vertical section through the device, Figure 3 is a cross section along the line III—III in Figure 2, and Figure 4 is a similar section along the line IV—IV in Figure 2.

In the drawing 1 denotes a cylinder body the bore of which is closed at both ends by means of heads or end pieces 1' screwed therein.

In the bore of the cylinder body 1 are arranged four membranes each comprising a cylindrical ring 2 closed by a membrane plate 2' which is arched spherically outwardly in axial direction as shown. The ring 2 and plate 2' is formed integrally, the circumferential part of the plate 2' emerging into the ring 2 in a cross plane intermediate the ends thereof. The inner surfaces of the ring 2 at each side of the membrane 2' slope outwardly so that the ring obtains a tapering cross section from the membrane 2' and towards each end. The membranes 2, 2' are made of a suitable elastic material such as a convenient rubber composition, or another material having equal properties.

The membranes are placed in pairs in the bore with the convex sides opposing each other and are held in position by means of a securing ring 3 positioned between the membranes of each pair, and a pressure disc or member 4 placed at the outer opposite sides of each pair. The rings 3 and members 4 are provided with circumferential channels or grooves 3' and 4' respectively at the ends thereof adapted to receive the adjacent portion of the ring 2 protruding from the membrane 2'. Thus, said portions of the rings 2, when said rings 3 and members 4 are forced together in the axial direction, are firmly clamped against the wall of the bore and thereby the membranes are held firmly in position without exerting any substantial compression of the portion of the membrane plates 2' lying between said rings and members.

Between the two middle members 4 and eventually also between each of the end pieces 1' and the adjacent member 4 are interposed elastic packings 5 and 5' respectively, which by tightening the said end pieces 1' bring about a predetermined compression pressure on the members between which the membranes are clamped.

Mounted in this manner each membrane defines by its concave face, together with a similar cavity 6 formed in the adjacent pressure member 4, a chamber 7 and between the convex faces of the membranes of each pair is defined a chamber 8.

Each of the pressure members 4 is provided with a circumferential groove 9 which is in communication with the adjacent chamber 7 by means of a number of circumferentially spaced channels or holes 9' and in a similar manner each of the rings 3 is provided with a circumferential groove 10 communicating by holes 10' with the adjacent chamber 8.

The grooves in the pressure members 4 are, by means of channels in the wall of the cylinder body, connected with pressure tubes 11 each leading to a separate brake of the four brakes of the vehicle.

In a radial enlargement 12 of the cylinder body, extending substantially in the whole length thereof, is mounted a cock 13 having a rotatable tapering valve member 14 provided with an axial bore 15 extending to a suitable depth from the lower end thereof. Said bore 15 is in permanent communication with an inlet channel 16 which by means of a pipe 17 (see Figure 3) is connected with a master or pressure cylinder (not shown) operated by a brake pedal. The valve member is provided with a diametrical bore 18 which in the normal position of the member 14 connects two longitudinal channels 19 with the inlet 16, which channels 19 by means of branches 19' communicate with the grooves 10 of the respective rings 3 and thereby with the respective chambers 8.

Further the valve member 14 is provided with two diametrical parallel and spaced bores 20, 21, extending at right angle to the bore 18, by means of which four channels 20', 20'' and 21', 21'' respectively, leading to the groove 9 of the respective pressure members 4, may be connected to the inlet 16.

The chambers 7 and pressure tubes 11 are filled with pressure liquid, such as oil, and so are also the chambers 8 which through the valve member 14 communicate with the master or pressure cylinder. When thus during braking the pressure within the chambers 8 increases this pressure increase is conveyed to the liquid within the chambers 7 by movement of the membranes 2' in the respective pairs away from one another, as clearly will be understood.

In case a leak occurs in any of the pressure pipes 11, or in the brakes proper, the membrane 2', defining the chamber 7 communicating therewith, by increase in the pressure within the adjacent chamber 8 is forced to an inverted position in which case it becomes seated on the surface of the adjacent cavity 6 of member 4 so that the braking pressure is maintained in the remainder of the chamber 7 and the brake connected therewith.

In order to prevent material of the membrane during such cases being pressed into the holes 9' and thereby being damaged, said mouths are each made of a relatively little area, or they may be covered by a fine-meshed wire screen 22 (Figure 4) which may cover the whole end surface of said member 4.

In order to refill the chambers 7 with pressure liquid the valve member 14 is turned through an angle of 90° whereby the chambers 7 are connected to the inlet 16 at the same time as the channels 19 leading to the chambers 8 are being closed. The chambers 7 may also be provided with separate air escape valves or may be connected to a common valve of this type.

We claim:

1. A safety device adapted to be positioned between a master cylinder and brake cylinders of a hydraulic brake system, comprising a cylindrical member, a bore in said member, heads detachably secured on the ends of said cylindrical member to close said bore, a plurality of semispherical diaphragms having concave and concave surfaces within said bore spaced axially thereof, said diaphragms being arranged in pairs with their convex surfaces facing each other, an intermediate annular member positioned between each pair of diaphragms, and defining together with said convex surfaces a pressure chamber, said chamber having a port opening to the master cylinder, a clamping member in said bore on the other side of each diaphragm of a pair, each said clamping member having a central semispherical cavity facing the concave surface of the diaphragm and defining therewith a pressure chamber opening to a pressure line, each of the diaphragms being provided at its circumference with axially extending flanges having outwardly tapering cross-section, correspondingly shaped annular grooves in the adjacent face of the annular member and the clamping member, respectively, receiving the flanges of said diaphragm, said annular members, clamping members and intermediate diaphragms being shaped to be slidably inserted into said bore, and clamped together between said detachably secured heads.

2. A device according to claim 1 in which the annular member is provided with ducts leading from the pressure chamber between the convex surfaces of a pair of diaphragms to a circumferential groove in said annular member, which groove communicates with a pressure pipe for supplying liquid from the master cylinder to said pressure chamber.

3. A device according to claim 1, in which ducts are provided in each of said clamping members extending from the cavity therein to a circumferential groove which communicates with a port adapted to be connected to a supply pipe for a brake cylinder.

4. A device according to claim 1 further comprising a valve by means of which the connection between the groove of the annular member and the pressure pipe may be closed and communication established between said pipe and the grooves of the clamping members for filling of the supply pipes.

References Cited in the file of this patent

UNITED STATES PATENTS

| | | |
|---|---|---|
| 2,062,798 | Sabins | Dec. 1, 1936 |
| 2,125,266 | Begg et al. | Aug. 2, 1938 |
| 2,192,012 | La Brie | Feb. 27, 1940 |
| 2,246,621 | Davis | June 24, 1941 |
| 2,624,176 | Osborne | Jan. 6, 1953 |